(12) United States Patent
Narevicius (10) Patent No.: US 7,609,918 B2
(45) Date of Patent: Oct. 27, 2009

(54) METHOD AND APPARATUS FOR OPTICAL MODE DIVISION MULTIPLEXING AND DEMULTIPLEXING

(75) Inventor: Edvardas Narevicius, Sunnyvale, CA (US)

(73) Assignee: Optun (BVI) Ltd., Tortola (VG)

( * ) Notice: Subject to any disclaimer, the term of this patent is extended or adjusted under 35 U.S.C. 154(b) by 0 days.

(21) Appl. No.: 10/515,927

(22) PCT Filed: May 28, 2003

(86) PCT No.: PCT/IL03/00443

§ 371 (c)(1),
(2), (4) Date: Nov. 24, 2004

(87) PCT Pub. No.: WO03/100490

PCT Pub. Date: Dec. 4, 2003

(65) Prior Publication Data

US 2005/0254750 A1    Nov. 17, 2005

Related U.S. Application Data

(60) Provisional application No. 60/383,325, filed on May 28, 2002, provisional application No. 60/383,326, filed on May 28, 2002.

(51) Int. Cl.
*G02B 6/26* (2006.01)
(52) U.S. Cl. .......................................... 385/28; 385/31
(58) Field of Classification Search .................. 385/28, 385/31
See application file for complete search history.

(56) References Cited

U.S. PATENT DOCUMENTS

| | | | | |
|---|---|---|---|---|
| 4,556,279 A | * | 12/1985 | Shaw et al. | 385/30 |
| 4,817,205 A | * | 3/1989 | Asawa | 398/44 |
| 4,828,350 A | | 5/1989 | Kim et al. | |
| 4,915,468 A | | 4/1990 | Kim et al. | |
| 5,003,623 A | * | 3/1991 | Asawa | 398/44 |
| 5,418,868 A | | 5/1995 | Cohen et al. | |
| 5,574,808 A | | 11/1996 | van der Tol | |
| 5,611,007 A | | 3/1997 | Wolf et al. | |
| 5,623,566 A | | 4/1997 | Lee et al. | |
| 5,703,977 A | | 12/1997 | Pedersen | |
| 5,907,647 A | | 5/1999 | Eggleton et al. | |
| 5,915,050 A | | 6/1999 | Russell et al. | |
| 6,580,844 B2 | * | 6/2003 | Leuthold | 385/15 |

(Continued)

FOREIGN PATENT DOCUMENTS

DE    19653744    6/1998

(Continued)

OTHER PUBLICATIONS

Berdague et al. (mode division multiplexing in optical fibers); Applied Optics/vol. 21, No. 11/June 1, 82.*

(Continued)

*Primary Examiner*—K. Cyrus Kianni
(74) *Attorney, Agent, or Firm*—Pearl Cohen Zedek Latzer, LLP (57) ABSTRACT

A method of mode selective coupling or mode multiplexing between integrated multimode (600) and single mode (602) waveguides. Evanescent coupling and tapering is used so that the signal may be transferred adiabatically from a first region of a first waveguide to a second, proximal, region of a second waveguide.

16 Claims, 6 Drawing Sheets

U.S. PATENT DOCUMENTS

| | | | |
|---|---|---|---|
| 7,020,358 | B2* | 3/2006 | Tabuchi et al. ............... 385/24 |
| 2001/0017962 | A1 | 8/2001 | Yun et al. |
| 2002/0168129 | A1 | 11/2002 | Gruber et al. |
| 2002/0176131 | A1 | 11/2002 | Walters et al. |
| 2002/0191886 | A1 | 12/2002 | Castoldi et al. |
| 2003/0012509 | A1 | 1/2003 | Chang et al. |
| 2003/0039430 | A1 | 2/2003 | Deliwala |
| 2004/0208447 | A1* | 10/2004 | Ramadan ............... 385/39 |
| 2005/0157979 | A1 | 7/2005 | Vorobeichik et al. |

FOREIGN PATENT DOCUMENTS

| | | | |
|---|---|---|---|
| EP | 0513919 | | 11/1992 |
| EP | 0645650 | | 3/1995 |
| GB | 2143394 | | 2/1985 |
| GB | 2143394 | A * | 2/1985 |

OTHER PUBLICATIONS

U.S. Appl. No. 10/515,768, filed Nov. 24, 2004, Narevicius et al.

Vance, et al, "Asymmetric Adiabatic Multiprong for Mode Multiplexed Systems", Electronics Letters, vol. 29, Nov. 25, 1993, pp. 2134-2136.

Shani, et al., "Integrated Optic Adiabatic Devices on Silicon", IEEE Journal of Quantum Ekectronics, vol. 27, No. 3, Mar. 1991, pp. 556-566.

Burns et al., "Active Branching Waveguide Modulator", Applied Physics Letters, vol. 29, No. 12, Dec. 15, 1976, pp. 790-792.

Sasaki et al., "Theoretical and Experimental Studies Active Y-Junctions in Optical Waveguides", IEEE Journal of Quantum Electronics, vol. QE-14, No. 11, Nov. 1978, pp. 883-892.

Haruna et al., "Thermo-Optic Deflection and Switching in Glass", Applied Optics, vol. 21, No. 19, Oct. 1, 1982, pp. 3461-3465.

Gokhberg, et al., Solution of the Vector Wave Equation by the Separable Effective Adiabatic Basis Set Method, J. Opt. Soc. Am., vol. 21, No. 10, Oct. 2004, pp. 1809-1817.

Burns et al., "Waveguide Transitions and Junctions", in "Guided-wave Optoelectronics", Edited by T. Tamir, Berlin, New York: Springer-Verlag (1990).

Narevich, et al., Optical Switching Based on the Adiabatic Temperature Induced Mode Localization, IEEE, 2003, pp. 128-129.

Whalen et al., "Effectively Non-Reciprocal Evanescent-Wave Optical-Fibre Directional Coupler", Electronic Letters, vol. 21, No. 5, 1985, pp. 175-176.

Wood, "Increased Power Injection in Multimode Optical-Fibre Buses through Mode-Selective Coupling", J. Lightwave Technol. (USA), vol. LT-3, No. 3, 1985, pp. 537-543.

Sorin et al., "Highly Selective Evanescent Modal Filter for Two-Mode Optical Fibers", Optics Letters, Optical Society of America, Washington, US, vol. 11, No. 9, Sep. 1, 1986, pp. 581-583.

Kapoustine et al., "Power Coupling between Fiber and Multimode Slab Composite Waveguide", Optics Communications, North-Holland Publishing Co., Amsterdam, NL, vol. 204, No. 1-6, Apr. 1, 2002, pp. 171-178.

Kwang et al., "High Performance Fused-Type Mode Selective Coupler for Two-Mode Fiber Devices", Optical Fiber Communication Conference (OFC), Technical Digest Postconference Edition, Baltimore, MD, Mar. 7-10, 2000, New York, NY: IEEE, US, vol. 1 of 4, Mar. 7, 2000, pp. TUB5-1-TUB5-3.

International Search Report for PCT/IL03/00443 dated Oct. 31, 2003.

* cited by examiner

METHOD AND APPARATUS FOR OPTICAL MODE DIVISION MULTIPLEXING AND DEMULTIPLEXING

CROSS-REFERENCE TO RELATED APPLICATIONS

This application is a National Phase Application of PCT International Application No. PCT/IL03/00443, International Filing Date May 28, 2003, claiming priority of U.S. Provisional Patent Applications, 60/383,325, filed May 28, 2002, and 60/383,326, filed May 28, 2002

BACKGROUND OF THE INVENTION

In the field of integrated optics, there may be a need to transfer a signal carried by one waveguide, for example, a single-mode wave-guide, to another waveguide, for example, a multi-mode waveguide, where the signal may be carried by one of a plurality of modes, each of a different order, or vice versa. One known way of doing so includes establishing a periodic perturbation using a static device designed to provide long period grating in the multimode waveguide, thereby to couple co-propagating modes. Among the drawbacks of this solution are its sensitivity to fabrication parameters and a difficulty in coupling modes residing in different waveguides. Another known method to convert a signal carried by a single-mode waveguide to be carried by a mode of a multi-mode waveguide is using an adiabatic asymmetric Y-branch. The drawbacks of this solution include the critical manufacturing tolerances of the device, and the poor separation between the divided modes leading to coupling and/or cross talk between the modes. A further known way to achieve mode-conversion is using a multi-mode interference converter; however, this solution has low conversion efficiency.

SUMMARY OF THE INVENTION

Embodiments of the present invention provide an apparatus and method of transferring a signal from a mode of one waveguide to a mode of another waveguide substantially without affecting other modes of the waveguides.

In accordance with some exemplary embodiments of the invention, there is provided an apparatus to transfer a signal from a first mode of a first waveguide to a second mode of second waveguide, the apparatus including a mode interaction region associated with mutually proximal regions of the first and second waveguides, wherein the signal carried by the first mode of the first waveguide is transferred to the second mode of the second waveguide without significantly affecting any other signal carried by any other mode of the first and second waveguides.

Additionally or alternatively, in accordance with exemplary embodiments of the invention, there is provided an apparatus to transfer a signal from a first mode of a first waveguide to a second mode of second waveguide, the apparatus including a mode interaction region associated with first and second mutually proximal regions of the first and second waveguides, respectively, wherein the absolute value of the difference between the effective index of refraction of the first mode at the first region and the effective index of refraction of the second mode at the second region is sufficiently small to enable transfer of the signal from the first mode to the second mode.

Further, in accordance with exemplary embodiments of the invention, there is provided a method of transferring a signal from a first mode of a first waveguide to a second mode of a second waveguide, including adiabatically transferring the signal from a first region of the first waveguide to a second, proximal, region of the second waveguide.

In accordance with some exemplary embodiments of the invention, there is provided a method of demultiplexing a plurality of signals, each signal being carried by a respective mode of a multi-mode source waveguide, to a plurality of single-mode destination waveguides, each signal to be carried by a respective destination waveguide, the method including adiabatically transferring each of the plurality of signals from a respective first region of the source waveguide to a second, proximal, region of each respective destination waveguide.

Additionally or alternatively, in accordance with exemplary embodiments of the invention, there is provided a method of multiplexing a plurality of signals, each signal being carried by a respective fundamental mode of a single-mode source waveguide, to a plurality of modes of a multi-mode destination waveguide, each signal to be carried by a respective mode of the destination waveguide, the method including adiabatically transferring each of the plurality of signals from a first region of each respective source waveguide to a respective second, proximal, region of the multi-mode destination waveguide.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

It will be appreciated that for simplicity and clarity of illustration, elements shown in the figures have not necessarily been drawn accurately or to scale. For example, the dimensions of some of the elements may be exaggerated relative to other elements for clarity or several physical components may be included in one functional block or element. Further, where considered appropriate, reference numerals may be repeated among the figures to indicate corresponding or analogous elements. It will be appreciated that these figures present examples of embodiments of the present invention and are not intended to limit the scope of the invention.

DETAILED DESCRIPTION OF EMBODIMENTS OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits may not have been described in detail so as not to obscure the present invention.

Figure 1:
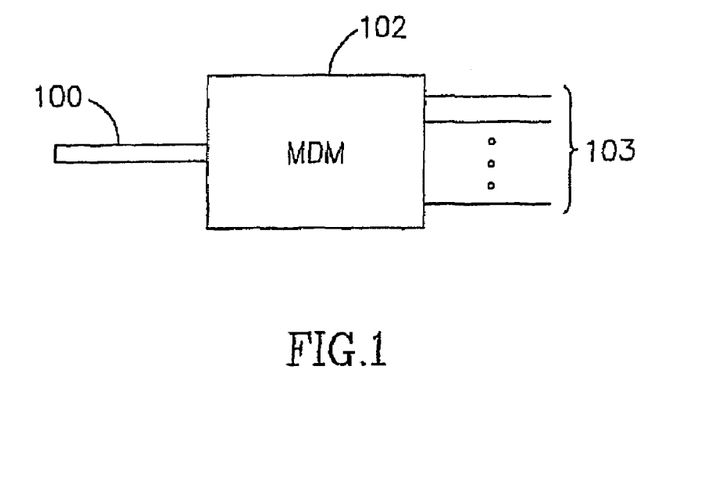
FIG. 1 is a schematic, simplified illustration of a mode division multiplexer/demultiplexer in accordance with exemplary embodiments of the present invention.

Embodiments of the present invention enable mode division multiplexing and demultiplexing. In mode division multiplexing in accordance with embodiments of the invention, signals from a given number, N, of single-mode (SM) waveguides may be combined into a multi-mode signal carried by single N-mode multi-mode (MM) waveguide, wherein each order mode carries a signal associated with a particular one of the SM waveguides. In mode division demultiplexing in accordance with embodiments of the invention, the N signals from a single N-mode multi-mode waveguide may be separated into N signals carried by N, respective, single-mode waveguides, wherein each SM waveguide carries a signal associated with a particular order mode of the MM waveguide. Thus, for example, as shown in FIG. 1, a device 102 in accordance with embodiments of the present invention may transfer the signals carried by an N-mode MM waveguide 100 carrying N signals to N single mode waveguides 103 each carrying one of the N signals.

A principle underlying some embodiments of the present invention is that of adiabatic mode interaction, whereby the signal carried by the highest order mode of a MM waveguide may interact with a mode of another waveguide, for example, a fundamental mode of a SM waveguide, without perturbing or coupling with the lower order modes in the MM waveguide, thereby leaving the non-separated modes intact or confined. A demultiplexing process in accordance with embodiments of the present invention may include a number of sub-processes as shown in the flowchart depicted in FIG. 2.

Figure 2:
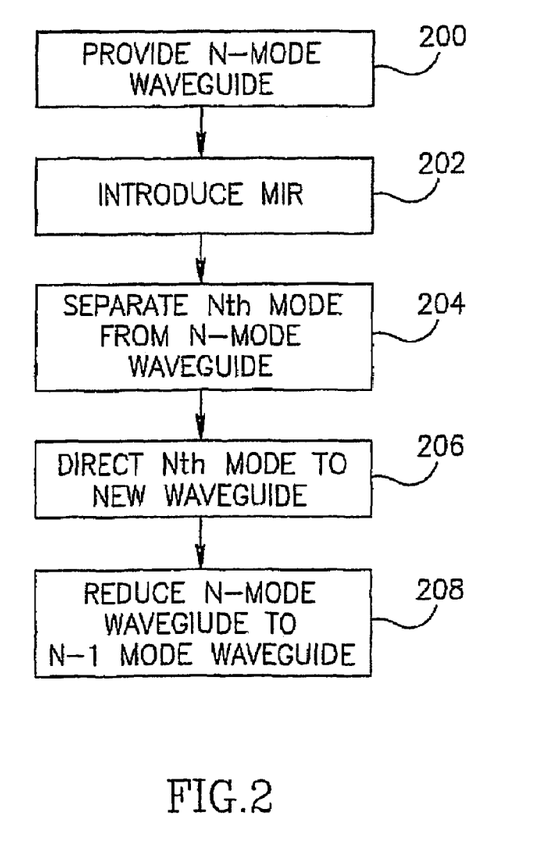
FIG. 2 is a schematic flowchart of a method of mode division demultiplexing in accordance with exemplary embodiments of the present invention.

Reference is made to the block diagram of FIG. 2, which depicts a demultiplexing method in accordance with some embodiments of the invention. The process begins with an N-mode MM waveguide, as indicated at block 200. A mode interaction region (MIR) may be introduced in the vicinity of the N-mode waveguide in order to perturb the Nth mode signal in the MM waveguide, as indicated at block 202. In an exemplary embodiment of the present invention, only the Nth mode signal in the MM waveguide is perturbed, and none of the other N−1 remaining modes are perturbed. This may cause the Nth mode to spatially separate from the MM waveguide, as indicated at block 204. As indicated at block 206, the Nth mode may subsequently be directed to another element, for example, a waveguide, which in exemplary embodiments may be a single-mode waveguide or a multi mode waveguide. In the former embodiment, wherein the second waveguide is a SM waveguide, the signal may be carried out by the fundamental mode of the SM waveguide. In the latter embodiment, wherein the second waveguide is a MM waveguide, the signal may be carried out by the high order mode of the MM waveguide. After the Nth mode has been separated, as indicated at block 204, and directed to a new waveguide, as in block 206, the N-mode waveguide may optionally be reduced to an N−1 mode waveguide, as shown in block 208. In some embodiments of the invention, this process may be repeated up to, for example, N−1 times, thereby to demultiplex up to N signals from a MM waveguide into up to N, respective, single mode waveguides. Alternately, the signals from the N-mode waveguide may be divided into a number of MM waveguides.

Figure 3:
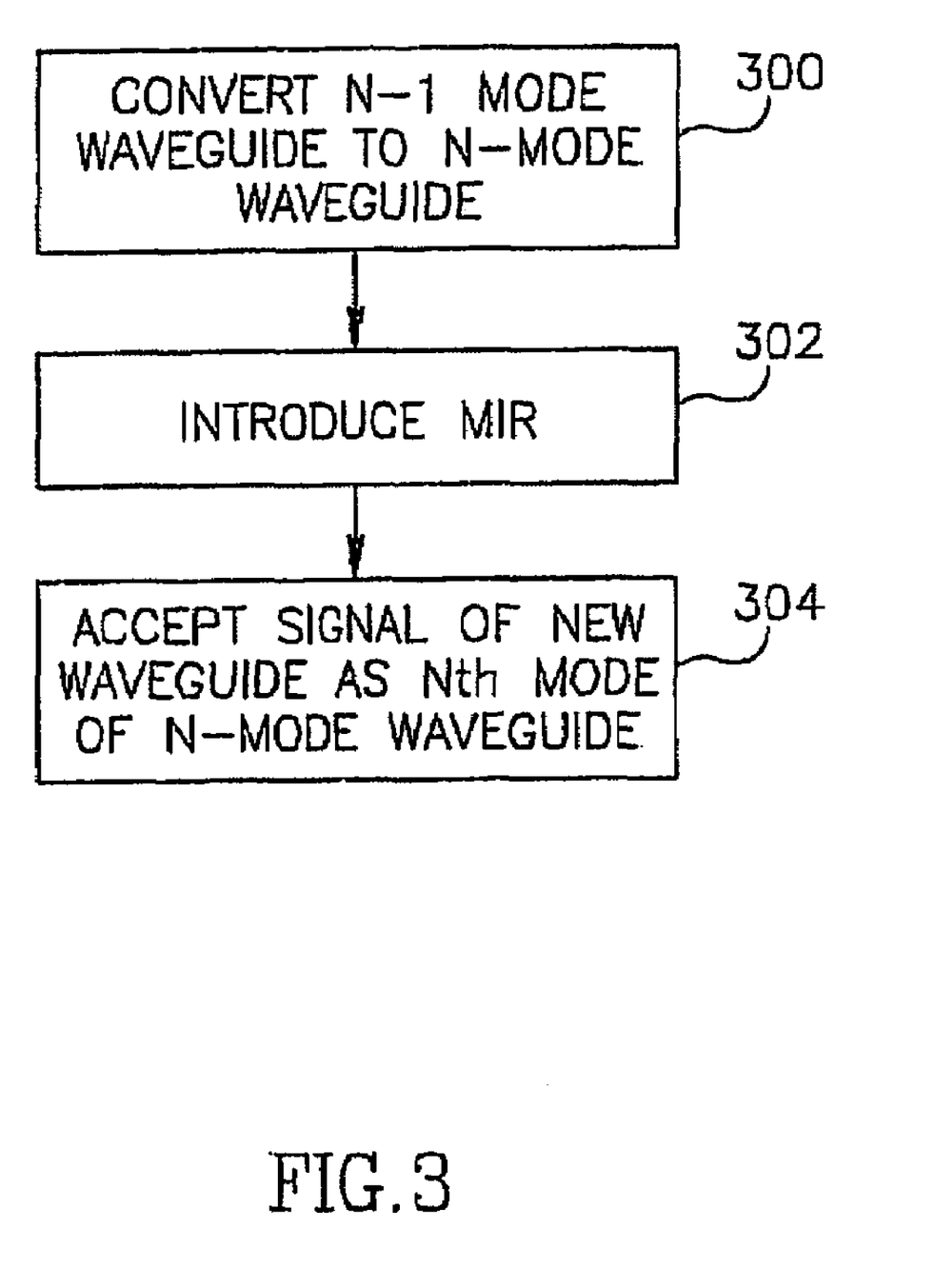
FIG. 3 is a schematic flowchart of a method of mode division multiplexing in accordance with exemplary embodiments of the present invention.

Likewise, as shown in FIG. 3, using substantially the same principles in reverse, a signal from a SM waveguide may be joined to an MM waveguide carrying N−1 modes as its new highest order mode thereby to obtain an N-mode signal traveling in an N-mode MM waveguide. As indicated at block 300, an N−1 mode waveguide may be enlarged or otherwise converted, to accommodate an additional mode, resulting in an N-mode waveguide. As indicated at block 302, a MIR as described in detail below may be introduced, as described below, to perturb the single mode in the SM waveguide and spatially separate the mode from the SM waveguide. As indicated at block 304, the MM waveguide may accept the single mode of the SM waveguide as its Nth order mode. By repeating this process as necessary, e.g., up to N−1 times, the process according to some embodiments of the present invention may be used to multiplex N signals, each carried by a SM waveguide, to N-mode signal carried by an N-mode MM waveguide, wherein each order mode corresponds to one of the signals carried by the SM waveguides.

The demultiplexing operation in accordance with embodiments of the invention will be described in detail herein. It will be clear to those of skill in the art that due to time reversal symmetry, the same principles may be used, substantially in reverse, for an analogous multiplexing function.

In accordance with embodiments of the invention, adiabatic mode interaction of the Nth mode of a MM waveguide may be achieved by a mode interaction region (MIR) introduced in the vicinity of a MM waveguide. In exemplary embodiments of the invention, the MIR may be introduced at a location where the amplitude of the highest order mode (HOM) is relatively large and the amplitudes of the lower order modes are relatively small. In such an arrangement, only the HOM may be significantly affected by the MIR, where it may interact with another mode of a proximal waveguide, for example, a fundamental mode of a proximal SM waveguide.

Figure 4A:
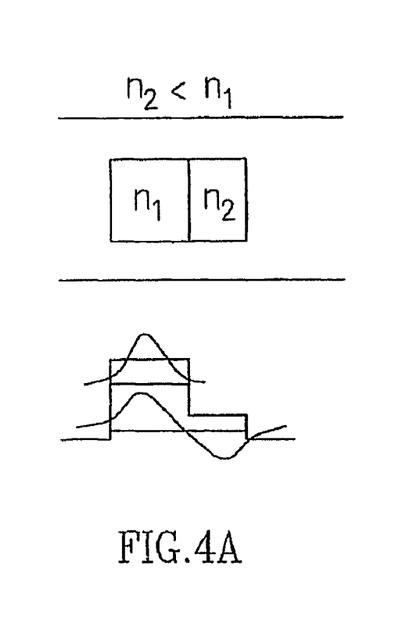
FIG. 4A-4C are schematic conceptual illustrations demonstrating three, respective, methods of accomplishing a mode interaction region in accordance with embodiments of the present invention.
Figure 4B:
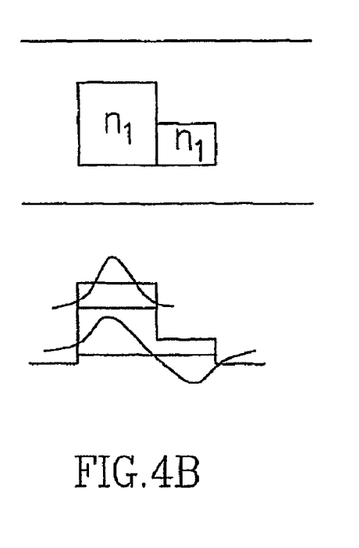
Figure 4C:
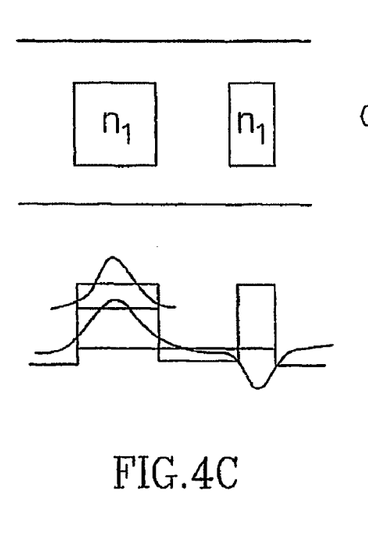

FIGS. 4A-4C, which refer to effective indices of refraction for various modes in the waveguides at a cross-section of the MIR, schematically illustrate at least three exemplary implementations of the MIR. In these embodiments, a MIR may be created by virtue of the difference between the effective index of refraction of the highest order mode of the MM waveguide and the effective index of refraction of the fundamental mode of the SM waveguide being smaller than the difference between the effective index of refraction of the highest order mode of the MM waveguide and the effective index of refraction of the next-highest order mode of the MM waveguide. Thus, the highest order mode of the MM waveguide may interact with the fundamental mode of the SM waveguide, while the next-highest order mode and other lower order modes remain confined to the MM waveguide.

In one embodiment of the invention, illustrated schematically in FIG. 4A, the MIR may be associated with a region of the SM waveguide where the core of the SM waveguide has a lower index of refraction compared to the index of refraction of the core of the MM waveguide. For example, in one exemplary embodiment according to FIG. 4A, the index of refraction of the cladding may be about 1.445, the index of refraction of the core of the MM waveguide may be about 1.455, and the index of refraction of the core of the SM waveguide may be about 1.451. In this embodiment, the effective index of refraction for the fundamental mode of the MM waveguide may be about 1.4512, and the effective index of refraction of the HOM of the MM waveguide may be about 1.4476. The effective index of refraction of the fundamental mode of the SM waveguide may be about 1.4478. In some exemplary embodiments in accordance with FIG. 4A, the mutually proximal regions of the SM and MM waveguides may have similar dimensions, for example, a width of 9.5 µm and a height of 6 µm. In these embodiments, the HOM of the MM waveguide may interact with the fundamental mode of the SM waveguide, and the remaining modes remain confined to the MM waveguide.

In another embodiment of the invention, illustrated schematically in FIG. 4B, the MIR may be associated with a region of the SM waveguide where the height of the SM waveguide is lower than that of the MM waveguide. It will be understood by those of skill in the art that in an exemplary version of the embodiment shown in FIG. 4B, the core of the SM waveguide may have the same index of refraction as the core of the MM waveguide or a different index of refraction, provided that the difference between the effective index of refraction of the highest order mode of the MM waveguide and the effective index of refraction of the fundamental mode of the SM waveguide being smaller than the difference between the effective index of refraction of the highest order mode of the MM waveguide and the effective index of refraction of the next-highest order mode of the MM waveguide. Thus, the highest order mode of the MM waveguide is able to interact with the fundamental mode of the SM waveguide while the lower order modes of the MM waveguide are confined. In one exemplary embodiment of the invention in accordance with FIG. 4B, the height of the MM waveguide may be about 6 µm, while the SM waveguide may have a minimal height of about 2.5 µm. In this embodiment, the index of refraction of the cladding may be 1.445, and the core indices of refraction of the MM waveguide and the SM waveguides may both be about 1.455. The effective indices of refraction of the fundamental mode and the HOM of the MM waveguide may be about 1.4512 and about 1.4476, respectively. The effective index of refraction of the fundamental mode of the SM waveguide may be about 1.4477. The width of the MM and SM waveguides may both be about 9.5 µm.

In yet another embodiment of the invention, illustrated schematically in FIG. 4C, the SM waveguide may be separated from the MM waveguide by a predefined gap, which may include the cladding region material. It is noted that the amplitude of the waveguide modes may decrease exponentially in a cladding region of the waveguide, e.g., at or near the circumferential edge of the cross-section of the waveguide. It is further noted that the electric field amplitude of higher order modes, whose effective refractive indices are lower than the refractive index of the fundamental mode, decreases more moderately in the cladding region than the electric field of the fundamental mode. Thus, there may be a natural differentiation among different order modes in the cladding region. This natural differentiation may be utilized by exemplary embodiments of the invention, for example, by placing the MIR in the cladding region rather than in a region at or near the core of the MM waveguide. Thus, in an exemplary version of the embodiment shown in FIG. 4C, the SM waveguide may have the same height and core index of refraction as the MM waveguide; however, by virtue of the separation, only the highest-order mode of the MM waveguide is able to extend to the fundamental mode of the SM waveguide. According to exemplary embodiments of the invention having a separation between the waveguides, the minimum distance between the waveguides may be between approximately one half wavelength and approximately ten wavelengths of a propagating electromagnetic field carrying the signal. Thus, for example, if the wavelength of a propagating electromagnetic field carrying the signal is 1.55 microns, then according to exemplary embodiments of the invention, the minimum distance between the MM waveguide and the SM waveguide may be between approximately 0.75 microns and approximately 15.5 microns. Typically, the smaller the minimum distance between the MM waveguide and the SM waveguide at the MIR, the greater the interaction between the two modes. However, too great a desired interaction between the modes, for example, by virtue of too small a minimum distance between the waveguides, may cause undesired interaction, e.g., between the lower-order modes of the MM waveguide and the SM waveguide.

It will be noted that in the above examples of FIGS. 4A-4C, in accordance with exemplary embodiments of the invention, the MIR may be introduced gradually in order for the changes to be induced adiabatically. Thus, for example, according to exemplary embodiments of the present invention, changes in the guiding media are performed adiabatically to minimize undesirable coupling between the different guiding modes of the waveguide and reducing the dependence of the performance of the device on the fabrication process parameters, thereby increasing the robustness of the device. Thus, for example, if tapering the waveguide is required, this may be achieved in any suitable shape, for example, linear, exponential, quadratic, etc., where the change introduced by such tapering is preferably adiabatic, and does not significantly couple between waveguide modes. In exemplary embodiments of the invention, the change in a dimension of a waveguide is performed over a segment of the waveguide having a length of at least one hundred the change in dimension.

Those of skill in the art will recognize that the creation of a MIR is not limited to the above examples depicted in FIGS. 4A-4C, nor is the invention limited to any one of the above techniques, but rather, some embodiments of the present invention may utilize a combination of the above and other techniques for creating a MIR.

FIGS. 5A-5D schematically illustrate four effective refractive index diagrams representing respective cross-sections of a mode division multiplexer/demultiplexer in accordance with embodiments of the present invention.

Figure 5A:
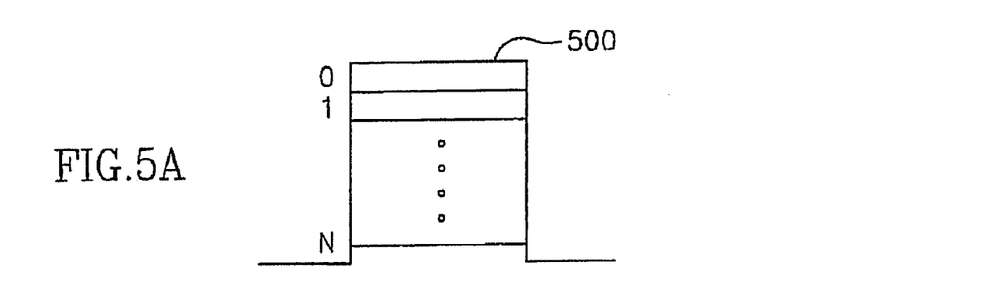
FIGS. 5A-5D are schematic illustrations of a sequence of five, respective, effective refractive index diagrams of a mode division multiplexer/demultiplexer in accordance with exemplary embodiments of the present invention.

FIG. 5A depicts an N-mode waveguide 500 supporting N modes and the levels of the effective indices of refraction of each of the respective modes.

Figure 5B:
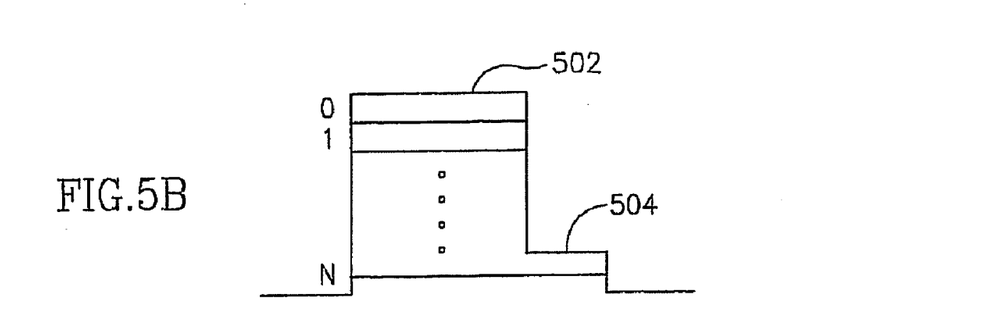

FIG. 5B depicts introducing a MIR 504 supporting a mode having an effective index of refraction similar to that of the HOM of the MM waveguide 502. Thus, the MIR 504 can support the HOM but not the lower order modes of the MM waveguide 502, and the HOM of the MM waveguide 502 may be extended. The extension of the HOM of the MM waveguide may be accomplished in any manner consistent with embodiments of the present invention, including those discussed with reference to FIG. 4. In exemplary embodiments of the present invention, the MIR may be associated with a region of increasing width, such that the effective refractive index of the Nth mode is increased. As depicted in FIG. 5B, when the width of the region is sufficiently large to support a guided mode, the signal carried by the extended Nth mode of the MM waveguide 502 adiabatically transfers to the fundamental mode of this new region. Moreover, as depicted in FIG. 5B, because the remaining N−1 lower order modes are confined to the MM waveguide 502, their coupling to the new waveguide may be diminutive.

Figure 5C:
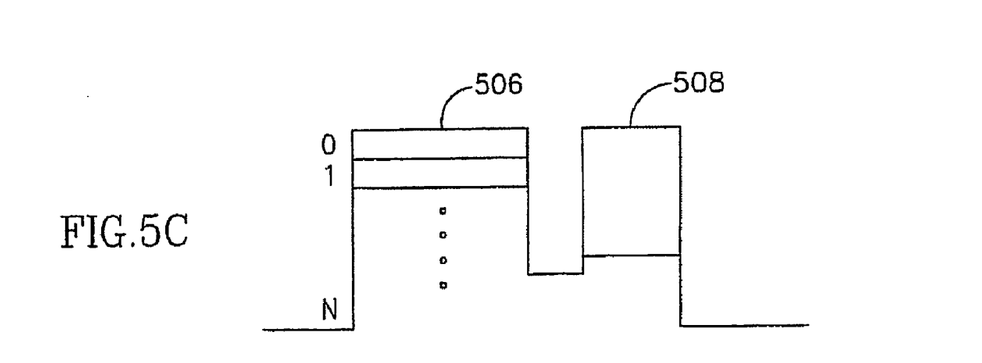

FIG. 5C depicts the separation or cleavage between the MM waveguide 506 and the region 508, which carries a signal identical to that carried by the HOM of the MM waveguide 506. The newly separated region 508 is in effect a new waveguide, which now carries as its fundamental mode a signal from the Nth mode of the MM waveguide 506.

Figure 5D:
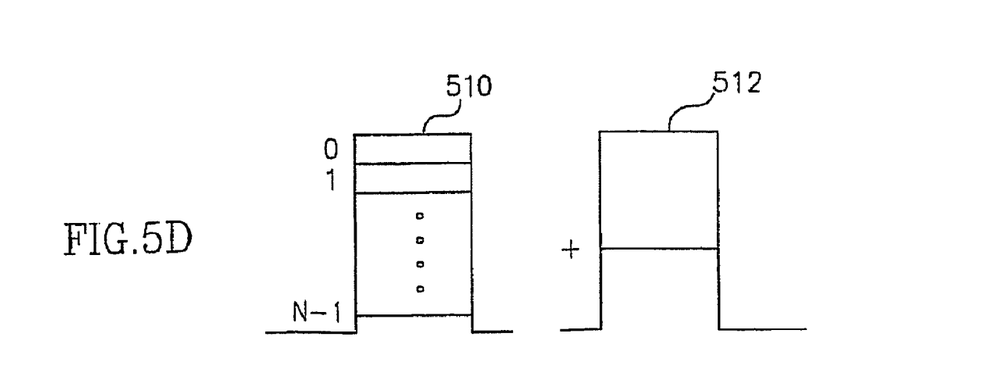

Finally, having accomplished the transfer of the signal carried by the Nth mode of the MM waveguide to the fundamental mode of the newly created SM waveguide 512, FIG. 5D depicts the reduction of the elimination of the Nth mode of the MM waveguide, and the reduction of the N-mode waveguide to a N–1 mode waveguide 510, for example, by reducing the width of the MM waveguide as appropriate. Moreover, after transferring the Nth order mode from the MM waveguide, the newly created waveguide 512 may be directed away from the MM waveguide 510, for example, to an output port.

It should be noted that the present invention is not limited to use in conjunction with a SM waveguide. Some embodiments of the present invention may transfer a signal from one MM waveguide to another MM waveguide. In some of these embodiments, a degeneracy may be created between the HOM of a first MM waveguide and an Nth order mode of a second waveguide.

Figure 6:
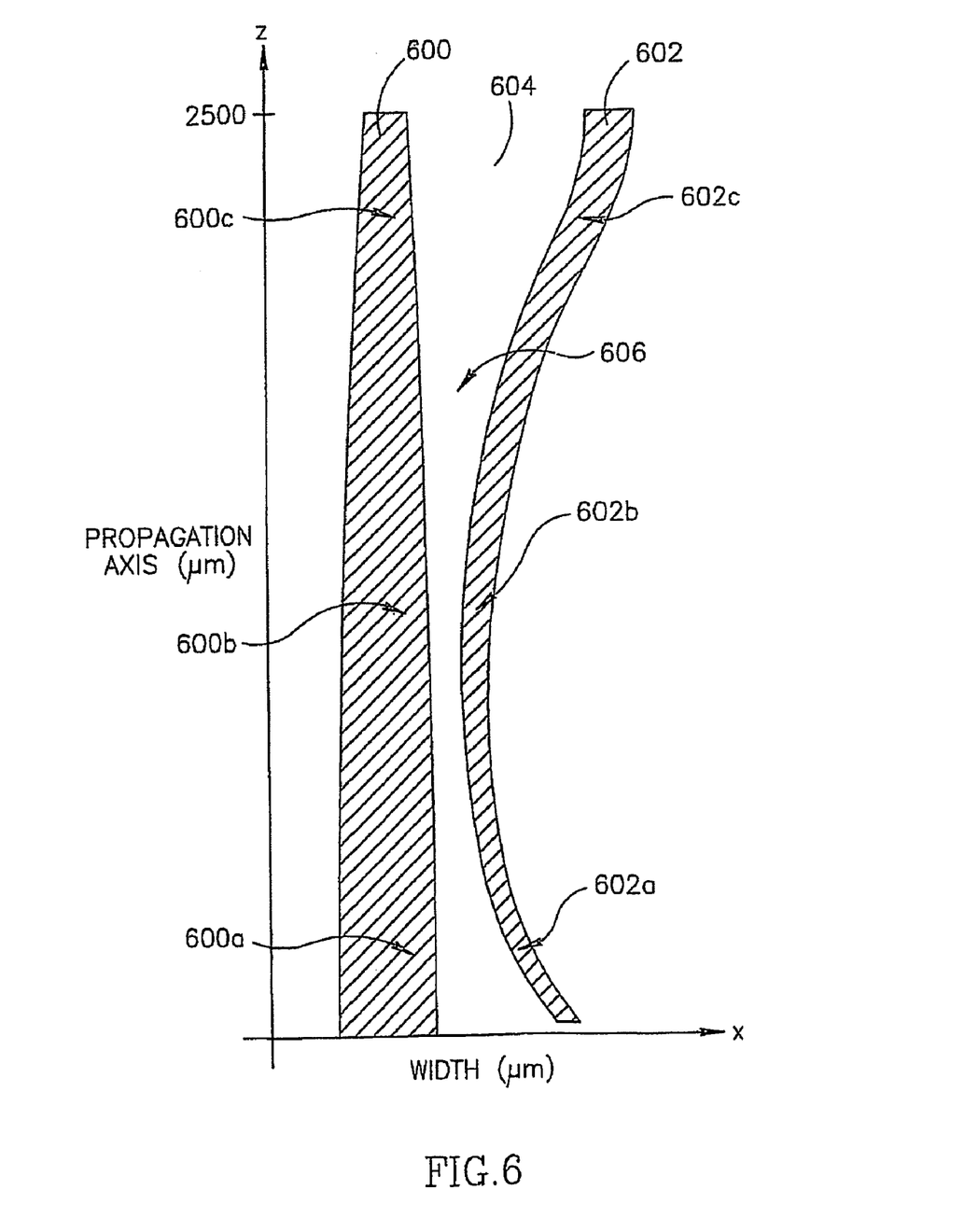
FIG. 6 is a schematic illustration of a layout of a mode division multiplexer/demultiplexer in accordance with exemplary embodiments of the present invention.

FIG. 6 schematically illustrates an exemplary embodiment of an optical device according the present invention for a 2-order mode division multiplexer/demultiplexer. The vertical axis in FIG. 6 corresponds to the length of the waveguides along the propagation axis of the signal, and the horizontal axis in FIG. 6 corresponds to the width of the waveguides transverse to the propagation axis. Although not depicted in FIG. 6, it will be appreciated that the waveguides may also have a dimension of height. In the particular embodiment depicted, the heights of the waveguides do not vary; however, it will be appreciated that in other embodiments, the height of the waveguides may be made to vary as appropriate.

FIG. 6 illustrates an exemplary configuration of a dual-mode MM waveguide 600 and a single mode waveguide 602, which may be separated by cladding 604. In this example, the core of MM waveguides 600 and 602 may be formed of Ge-doped silica, whereas a cladding 604 may generally consist of silica, if desired. In this example, the refractive index of the core of waveguides 600 and 602 may be, e.g., $n_1=1.46$ and the refractive index of cladding 604 may be, for example, $n_0=1.44$.

As shown in FIG. 6, a MM waveguide 600 having an initial width at z=0 μm of, e.g., about 12 μm, may be tapered to an ultimate width at z=2500 μm of, e.g., about 5.5 μm, keeping the height constant at, e.g., about 2 μm. At the initial width of about 12 μm, the MM waveguide 600 may support two (N=2) guided order modes. At an ultimate width of about 5.5 μm, the waveguide 600 may only support the fundamental (N=1) mode. It will be understood that these numerical distances may be dependent on a specific design consideration, and may vary among various embodiments of the invention depending, for example, on an allowable level of cross talk. In the embodiment shown, the SM waveguide 602 may begin at a width of, e.g., about 2 μm, at a distance from the MM waveguide 600 sufficient so as not to affect any mode in the MM waveguide at region 600a.

In this embodiment, the MIR 606 may be achieved by mutually proximal regions of the MM waveguide and SM waveguide, 600b and 602b, respectively. Thus, as shown in FIG. 6, an initial region 602a of SM waveguide may be gradually introduced and brought proximate to the first waveguide at 602b and 600b respectively. Region 602b of the SM waveguide 602 may adiabatically approach region 600b of the MM waveguide 600, thereby creating interaction between the HOM of the MM waveguide 600 and the fundamental mode of the SM waveguide 602, where the interaction is substantially at a maximum when the distance between the edges of the two waveguides is substantially at its minimum, for example, at about 3 μm. At this minimum distance between the waveguides, the effective index of refraction of the HOM of the MM waveguide may be $n_{HOM}=1.447$ and the effective index of refraction of the next-higher-order mode (i.e., the fundamental mode) of the MM waveguide may be $n_{LOM}=1.452$. It should be noted that these figures represent the effective indices of refraction of the modes in the waveguides when isolated from each other, and that the mutual proximity of the waveguides, for example, in the MIR, may affect these indices of refraction. Also, at the MIR, the effective index of refraction of the fundamental mode of the SM waveguide may be $n_{FM}=1.4473$. It will be noted that, in this example, the difference between $n_{HOM}$ and $n_{LOM}$ is 0.005, whereas the difference between $n_{HOM}$ and $n_{FM}$ is only 0.0003. Thus, there may be interaction between the HOM of the MM waveguide and the fundamental mode of the SM waveguide, but the fundamental mode of the MM waveguide remains confined. In exemplary embodiments of the invention, it may be desirable that at the point of smallest distance between the waveguides, the modes of the two waveguides would be degenerate, i.e., have the same propagation constant. This, in turn, may place a restriction on the waveguide geometry and the refractive indexes.

It should be noted that while the interaction between the HOM of MM waveguide 600, i.e., in this example, one above the fundamental mode, and the fundamental mode of SM waveguide 602 at the MIR 606 is strong, the remaining mode of MM waveguide 600 does not interact strongly with the fundamental mode of SM waveguide 602. Due to this selective interaction, the degeneracy is lifted and the HOM of MM waveguide 600 is coupled to the fundamental mode of SM waveguide 602. A point within the MIR of strongest interaction between the HOM of MM waveguide 600 and the mode of SM waveguide 602 is defined herein as a point of avoided crossing. The point of avoided crossing may be characterized by an at least partial splitting between the propagation constants of the two modes. The extent of the splitting may be determined by the proximity of the two waveguides. Thus, a greater splitting between the modes caused by the interaction may increase the effectiveness of the adiabatic transition. In such case, the transition from the initial state to the final state may occur without significant mixing of the different optical modes. In exemplary embodiments of the present invention, adiabatic transition may be advantageous because it may reduce the dependence of the mode interaction on deviations from ideal conditions, e.g., due to different operation wavelength, fabrication process errors, or any other variable parameter.

As further shown in FIG. 6, after the HOM has been separated, the SM waveguide 602 may be directed at region 602c away from the MM waveguide 600, reducing the strength of mode interaction. Furthermore, the MM waveguide 600 may be tapered at region 600c to eliminate the HOM of the MM waveguide 600. The two modes emerging after the point of avoided crossing may be switched, namely, the fundamental mode of the SM waveguide may become the HOM of the MM waveguide, and the HOM of the MM waveguide may become the fundamental mode of SM waveguide 402. In exemplary embodiments of the invention, the change in the dimension of at least one of the waveguides is performed gradually. For example, in some exemplary embodiments of the invention, the change in dimension may be performed over a segment of the waveguide having a length of at least one hundred (100) times the desired amount of change. Thus, for example, in the embodiment shown in FIG. 6, a change of 6.5 µm may be performed over a waveguide segment having a length of approximately 2500 µm.

It will be noted from the above discussion that in embodiments of the present invention, the mode interaction region (MIR) may or may not be strictly a delineated region, but rather represents the region in which the modes interact. The MIR may overlap either or both of the waveguides; it may or may not include portions of cladding; it may extend to before and after the region of minimum difference between the effective indices of refraction of the pertinent modes.

Figure 7:
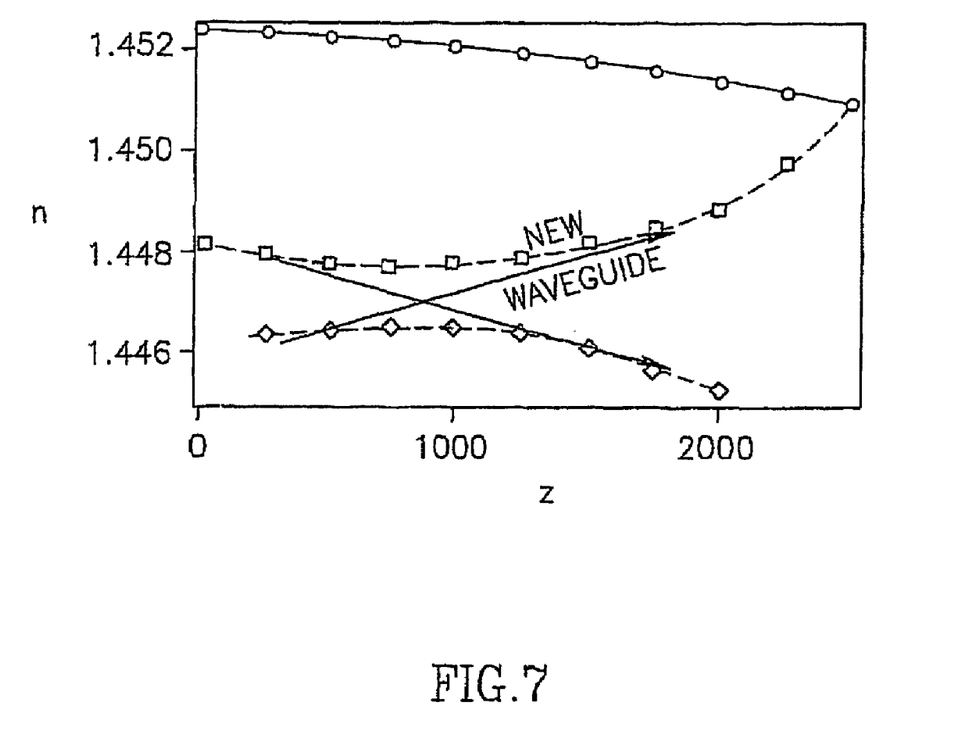
FIG. 7 is a schematic illustration of a graph of effective refractive index of local modes as a function of distance along the propagation axis of a mode division multiplexer/demultiplexer in accordance with the exemplary embodiment of FIG. 6.

The schematic diagram of FIG. 7 illustrates the effective refractive index of the local modes of the waveguide structure shown in FIG. 6 over the length of the MIR. As can be seen from the graphs of FIG. 7, at the start of the separation process, e.g., at the start of the MIR along the propagation dimension, there may be three co-existing modes of operation, namely, the fundamental mode of the MM waveguide, the HOM of MM waveguide, and the fundamental mode of the new waveguide. These three modes are represented by the open circles, diamonds and squares, respectively, in FIG. 7. At the end of the separation process, e.g., at the end of the MIR along the propagation dimension, only the fundamental mode of the MM waveguide may be correlated to the fundamental mode of the SM waveguide originating from the MM waveguide, whereas the HOM of the MM waveguide may be correlated to the fundamental mode of the new waveguide and the fundamental mode of the new waveguide may be correlated to a "leaky" mode of the SM waveguide originating from the MM waveguide. In an embodiment of the invention, where there is no tapering in the MM waveguide, the fundamental mode of the new waveguide may be correlated to the HOM of the MM waveguide. As seen in FIG. 7, the signal carried in the HOM of the MM waveguide transforms into a signal carried in the fundamental mode of the new waveguide, although only a single local mode is involved in the entire transition process, as designated by the graph of open squares in FIG. 7. In an exemplary embodiment of the invention, this process is performed adiabatically, so as not to induce coupling between different local modes.

The invention is not limited by the embodiments described above. In some embodiments, for example, in some demultiplexer applications, the source waveguide may be a MM waveguide and the destination waveguide may be a SM waveguide; in other demultiplexer applications, for example, the destination waveguide may also be a MM waveguide. In yet other embodiments, for example, in some multiplexer applications, the source waveguide may be a SM waveguide and the destination waveguide may be a MM waveguide; in other multiplexer applications, for example, the source waveguide may also be a MM waveguide. Moreover, introducing the MIR may be accomplished by bringing source and destination waveguides into mutual proximity in the different ways specified above or otherwise in accordance with the present invention.

It will be apparent to those of skill in the art that the present invention is not limited by the embodiments described above. For example, there may be other ways of introducing the MIR than those shown in the specific examples herein. Also, the various methods of inducing a MIR in the waveguide may be combined in the same device. Additionally, for example, the MM waveguide may carry more than two modes. Also, the HOM of the MM waveguide may be transferred to a HOM of the new waveguide, for example, where the new waveguide used to create the MIR is a MM waveguide.

As explained above, by virtue of time reversal symmetry, the demultiplexer configuration of FIG. 6, as well as other demultiplexer embodiments described herein, may also be used as multiplexers. This may be achieved by operating the devices such that light propagates in a reverse direction to that described for the demultiplexer embodiments. Specifically, if a signal is introduced as the fundamental mode of SM waveguide 602 at the distal end of the scheme shown in FIG. 6, this mode may be converted into a HOM of MM waveguide 600. Moreover, as shown in FIG. 7, the fundamental mode of the MM waveguide is substantially unaffected by the presence of the SM waveguide, whereby there is no coupling between the fundamental mode and HOM of the MM waveguide. This results in low cross talk between the modes.

While the invention has been described with respect to a limited number of embodiments, it will be appreciated that many variations, modifications and other applications of the invention may be made. Embodiments of the present invention may include other apparatuses for performing the operations herein. Such apparatuses may integrate the elements discussed, or may comprise alternative components to carry out the same purpose. It will be appreciated by persons skilled in the art that the appended claims are intended to cover all such modifications and changes as fall within the true spirit of the invention.

What is claimed is:

1. An apparatus to transfer a signal from a first mode of a first waveguide to a second mode of second waveguide, the apparatus comprising first and second waveguides, wherein the second waveguide is aligned substantially along said first waveguide, an initial portion of said second waveguide located at an initial distance from the first waveguide so as not to affect any mode in the first waveguide, and wherein the distance between the second waveguide and the first waveguide gradually decreases to a mode interaction region, thereby enabling adiabatic transfer of a signal carried by a first mode of said first waveguide to a second mode of said second waveguide having the same direction of propagation as said first mode, without affecting any other signal carried by any other mode of said first and second waveguides or any counter-propagating signal, wherein said adiabatic transfer of said signal is irrespective of operation wavelength of the signal.

2. The apparatus of claim 1, wherein at least at said mode interaction region the absolute value of the difference between the effective index of refraction of said first mode and the effective index of refraction of said second mode is sufficiently small to enable said adiabatic transfer of said signal from said first mode of said first waveguide to said second mode of said second waveguide.

3. The apparatus of claim 1, wherein the minimum transverse distance between said first and second waveguides at said mode interaction region is between approximately one half wavelength and approximately ten wavelengths of a propagating electromagnetic field carrying said signal.

4. The apparatus of claim 1, wherein said first waveguide is capable of accommodating a greater number of modes than said second waveguide and wherein said first mode is a highest order mode of the first waveguide.

5. The apparatus of claim 4, wherein at least at said mode interaction region the absolute value of the difference between the effective index of refraction for the first mode at said first waveguide and the effective index of refraction for the second mode of said second waveguide is less than the absolute value of the difference between the effective index of refraction for the highest-order mode of the first waveguide and the effective index of refraction of the next-highest-order mode of the first waveguide.

6. The apparatus of claim 5, wherein said second waveguide is a single-mode waveguide, and wherein said second mode is a fundamental mode of the second waveguide.

7. The apparatus of claim 1, wherein said second waveguide is capable of accommodating a greater number of modes than said first waveguide and wherein said second mode is a highest order mode of the second waveguide.

8. The apparatus of claim 7, wherein at least at said mode interaction region the absolute value of the difference between the effective index of refraction for the first mode of said first waveguide and the effective index of refraction for the second mode of the second waveguide is less than the absolute value of the difference between the effective index of refraction for the highest-order mode of the second waveguide and the effective index of refraction of a next-highest-order mode of the second waveguide.

9. The apparatus of claim 7, wherein said first waveguide is a single-mode waveguide and wherein said first mode is a fundamental mode of the first waveguide.

10. The apparatus of claim 1, wherein at least one property of at least one of said first and second waveguides changes adiabatically in the vicinity of said mode interaction region.

11. The apparatus of claim 10, wherein said at least one property is at least one dimension of said first waveguide transverse to the direction of propagation of said signal.

12. The apparatus of claim 11, wherein said at least one dimension is changed along a length in the direction of propagation of said signal equal to at least 100 times the change in said dimension.

13. The apparatus of claim 10, wherein said at least one property is a dimension of said second waveguide transverse to the direction of propagation of said signal.

14. The apparatus of claim 13, wherein said at least one dimension is changed along a length in the direction of propagation of said signal equal to at least 100 times the change in said dimension.

15. The apparatus of claim 10, wherein said at least one property further includes a dimension of said first waveguide transverse to the direction of propagation of said signal.

16. The apparatus of claim 10, wherein said at least one property is an index of refraction of at least one of said first and second waveguides.

\* \* \* \* \*